(12) United States Patent
England et al.

(10) Patent No.: US 7,676,498 B2
(45) Date of Patent: Mar. 9, 2010

(54) METHOD AND DATA PROCESSING SYSTEM FOR MANAGING USER ROLES

(75) Inventors: Laurence England, Morgan Hill, CA (US); Michael Y. Kwong, Stanford, CA (US); Steven Ma, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 210 days.

(21) Appl. No.: 11/422,214

(22) Filed: Jun. 5, 2006

(65) Prior Publication Data

US 2007/0282800 A1 Dec. 6, 2007

(51) Int. Cl.
*G06F 17/00* (2006.01)

(52) U.S. Cl. .............. 707/104.1; 707/101; 707/102; 707/103 R

(58) Field of Classification Search ............. 707/1–10, 707/100–104.1, 200–206; 713/150–180
See application file for complete search history.

(56) References Cited

U.S. PATENT DOCUMENTS

| | | | |
|---|---|---|---|
| 6,871,232 B2 | 3/2005 | Curie et al. | |
| 6,871,279 B2 | 3/2005 | Sames et al. | |
| 7,233,949 B2* | 6/2007 | Lee et al. ...................... | 707/9 |
| 2001/0011341 A1* | 8/2001 | Hayes, Jr. et al. ........... | 709/203 |
| 2004/0093526 A1* | 5/2004 | Hirsch ......................... | 713/202 |
| 2005/0039041 A1 | 2/2005 | Shaw et al. | |

OTHER PUBLICATIONS

Masso et al., "Towards Virtualization of User Interfaces based on UsiXML", Association for Computing Machinery, Inc., 2005, ACM Digital Library, pp. 169-178.
Keidl et al., "Towards Context-Aware Adaptable Web Services", WWW2004, May 2004, ACM Digital Library, pp. 55-65.
Grolaux et al., "Migratable User Interfaces: Beyond Migratory Interfaces", Proceedings of the First Annual International Conference on Mobile and Ubiquitous Systems: Networks and Services (MobiQuitous'04) 2004 IEEE, pp. 1-11.
Wang et al., "User Interface management with XML", Journal of Computer Aided Design & Computer Graphics, vol. 16, Issue 4, Apr. 2004, pp. 1-7.
Huang, "Running the Web backwards: appliance data services", Computer Networks 33 (2000) pp. 619-631.
http://help.eclipse.org/help31/topic/org.eclipse.platform.doc.isv/guide/workbench_advext_activities.htm, retrieved Jun. 3, 2006, pp. 1-3.

* cited by examiner

*Primary Examiner*—Isaac M Woo
(74) *Attorney, Agent, or Firm*—Yee & Associates, P.C.; Prentiss W. Johnson

(57) ABSTRACT

The illustrative embodiment provides a computer implemented method, a data processing system, and a computer program product for managing user roles. A customization application receives a request to modify a user role for an application. In response to the request, the customization application allows a user to modify a set of features associated with the user role to form a set of customized features. A role database stores the set of customized features for the user role. The user roles in the role database are available for use by a plurality of users of the application.

27 Claims, 12 Drawing Sheets

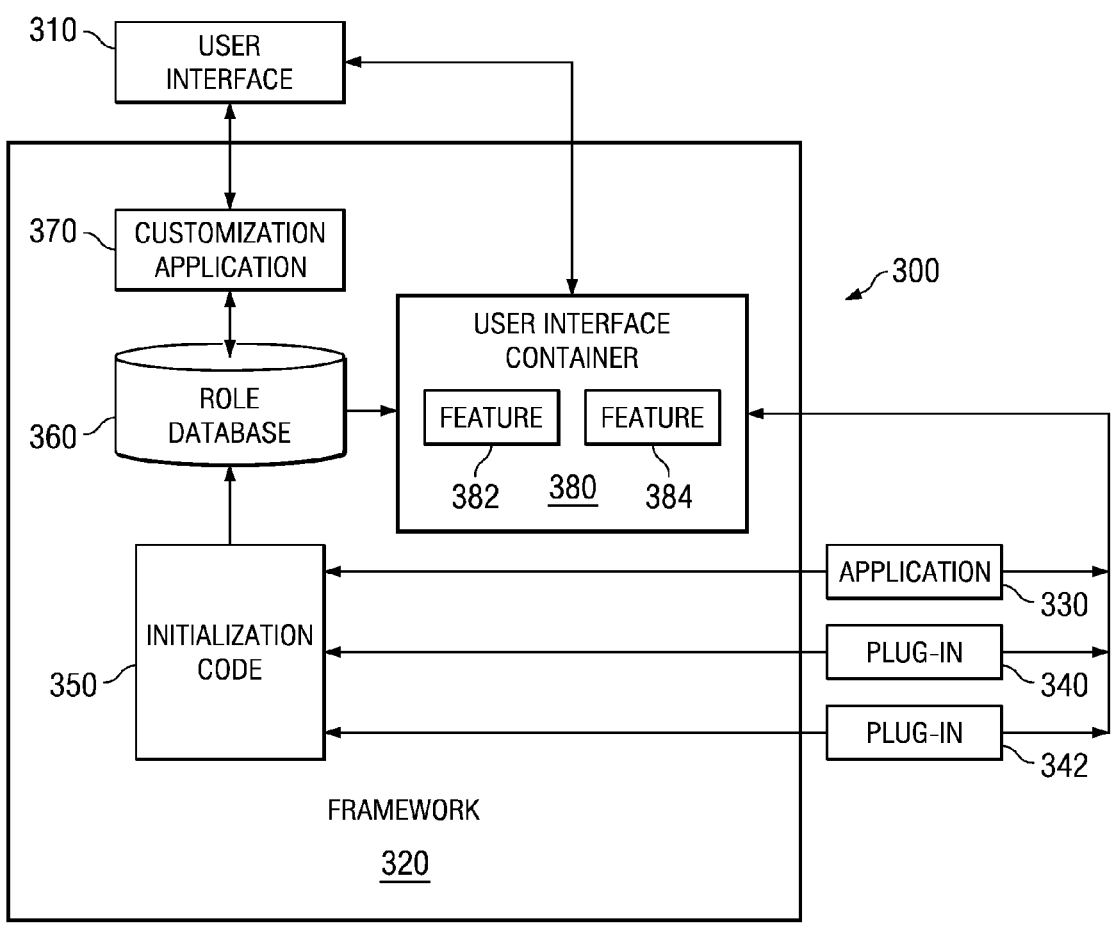

FIG. 4

CUSTOMIZED USER ROLE TABLE 400

| CUSTOMIZED USER ROLES (410) | USER INTERFACE FEATURE (412) | PLUG-IN (414) | PLUG-IN VERSION (416) |
|---|---|---|---|
| ARCHITECT (420) | IMPACT ANALYSIS | PROGRAM ANALYSIS PLUG-IN | 6.0.1 |
| DEVELOPER (422) | RUN UNIT TEST | TEST PLUG-IN | 6.0.1 |
| JAVA DEVELOPER (424) | JAVA COMPILE | JAVA PLUG-IN | 6.0.1.2 |
| JAVA PLATFORM, ENTERPRISE EDITION (J2EE) DEVELOPER (426) | ENTERPRISE JAVABEAN (EJB) DEPLOY | JAVA PLATFORM, ENTERPRISE EDITION (J2EE) PLUG-IN | 6.0.1.1 |
| JAVA PLATFORM, ENTERPRISE EDITION (J2EE) DEVELOPER (428) | ENTERPRISE JAVABEAN (EJB) BUILD | JAVA PLATFORM, ENTERPRISE EDITION (J2EE) PLUG-IN | 6.0.1.1 |
| DEPLOYER (430) | ENTERPRISE JAVABEAN (EJB) BUILD | JAVA PLATFORM, ENTERPRISE EDITION (J2EE) PLUG-IN | 6.0.1.1 |

DEFAULT USER ROLE TABLE 440

| DEFAULT USER ROLES (450) | USER INTERFACE FEATURE (452) | PLUG-IN (454) | PLUG-IN VERSION (456) |
|---|---|---|---|
| ARCHITECT (460) | IMPACT ANALYSIS | PROGRAM ANALYSIS PLUG-IN | 6.0.1 |
| DEVELOPER (462) | RUN UNIT TEST | TEST PLUG-IN | 6.0.1 |
| JAVA DEVELOPER (464) | JAVA COMPILE | JAVA PLUG-IN | 6.0.1.2 |
| JAVA PLATFORM, ENTERPRISE EDITION (J2EE) DEVELOPER (466) | ENTERPRISE JAVABEAN (EJB) BUILD | JAVA PLATFORM, ENTERPRISE EDITION (J2EE) PLUG-IN | 6.0.1.1 |
| DEPLOYER (468) | ENTERPRISE JAVABEAN (EJB) DEPLOY | JAVA PLATFORM, ENTERPRISE EDITION (J2EE) PLUG-IN | 6.0.1.1 |

FIG. 5

| | USER ROLE 510 | PERSPECTIVE 512 | VIEW 514 | MENU 516 |
|---|---|---|---|---|
| 520 | ARCHITECT | BUSINESS MODEL | CLASS DIAGRAM | IMPACT ANALYSIS |
| | | | SEQUENCE DIAGRAM | IMPACT ANALYSIS |
| 522 | ARCHITECT | UNIFIED MODELING LANGUAGE | CLASS DIAGRAM | IMPACT ANALYSIS |
| | | | SEQUENCE DIAGRAM | IMPACT ANALYSIS |
| 524 | DEVELOPER | UNIT TEST | SEQUENCE DIAGRAM | RUN UNIT TESTS |
| | | | UNIT TEST | RUN UNIT TESTS |
| 526 | JAVA DEVELOPER | JAVA | JAVA SOURCE EDITOR | JAVA COMPILE |
| 528 | JAVA PLATFORM, ENTERPRISE EDITION DEVELOPER | JAVA PLATFORM, ENTERPRISE EDITION | JAVA PLATFORM, ENTERPRISE EDITION SERVER VIEW | ENTERPRISE JAVABEAN DEPLOY |
| | | | | ENTERPRISE JAVABEAN BUILD |

500

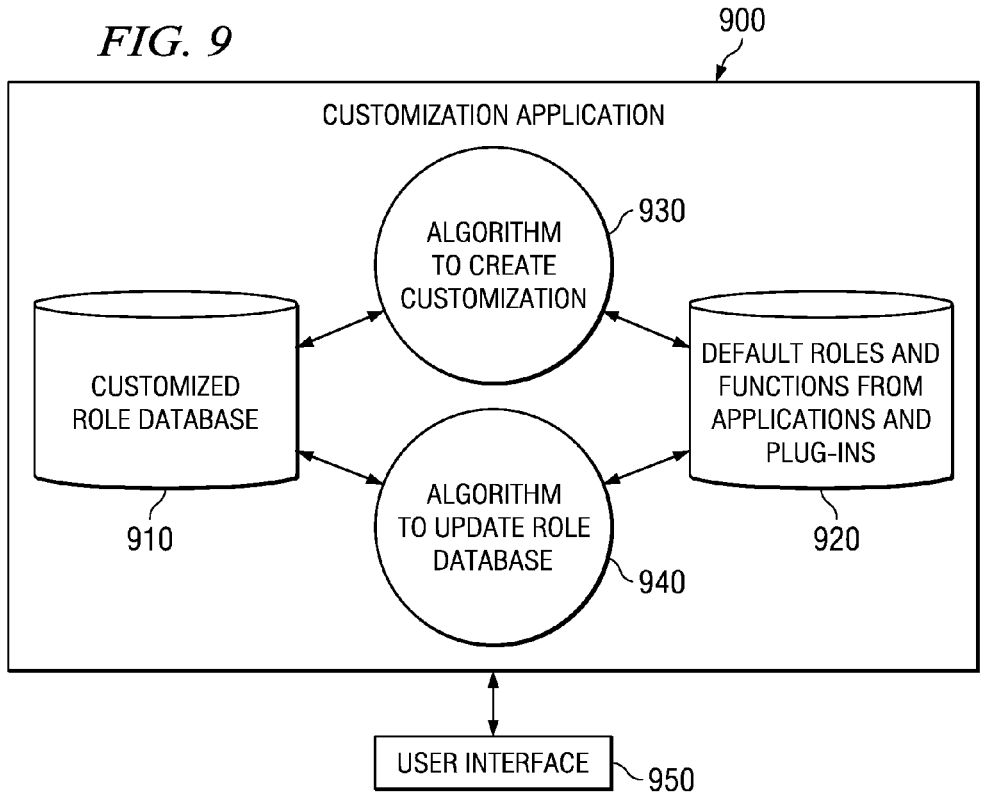
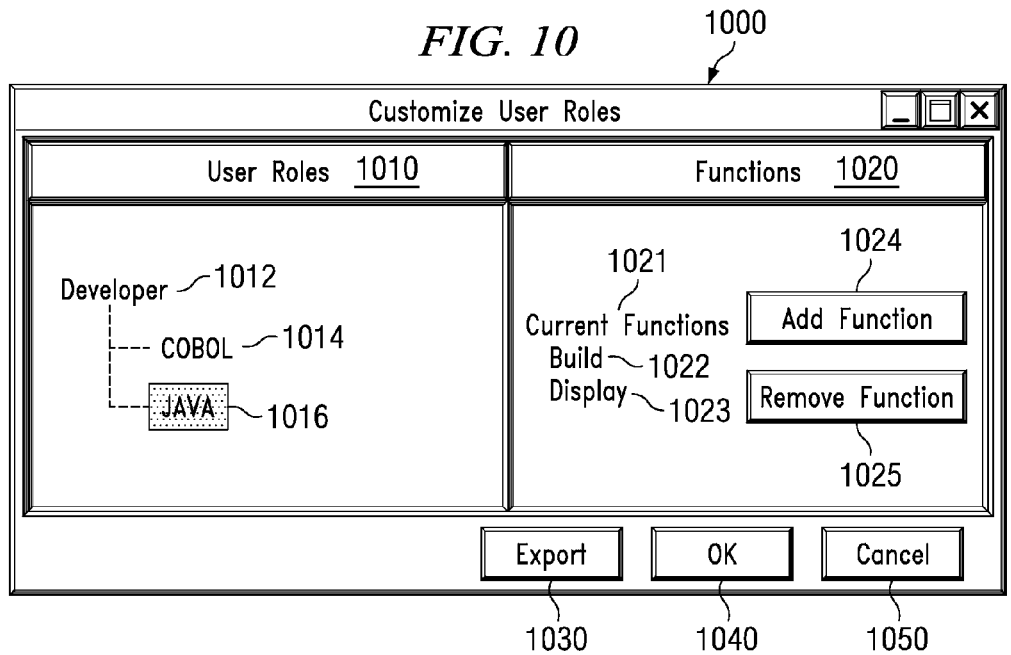

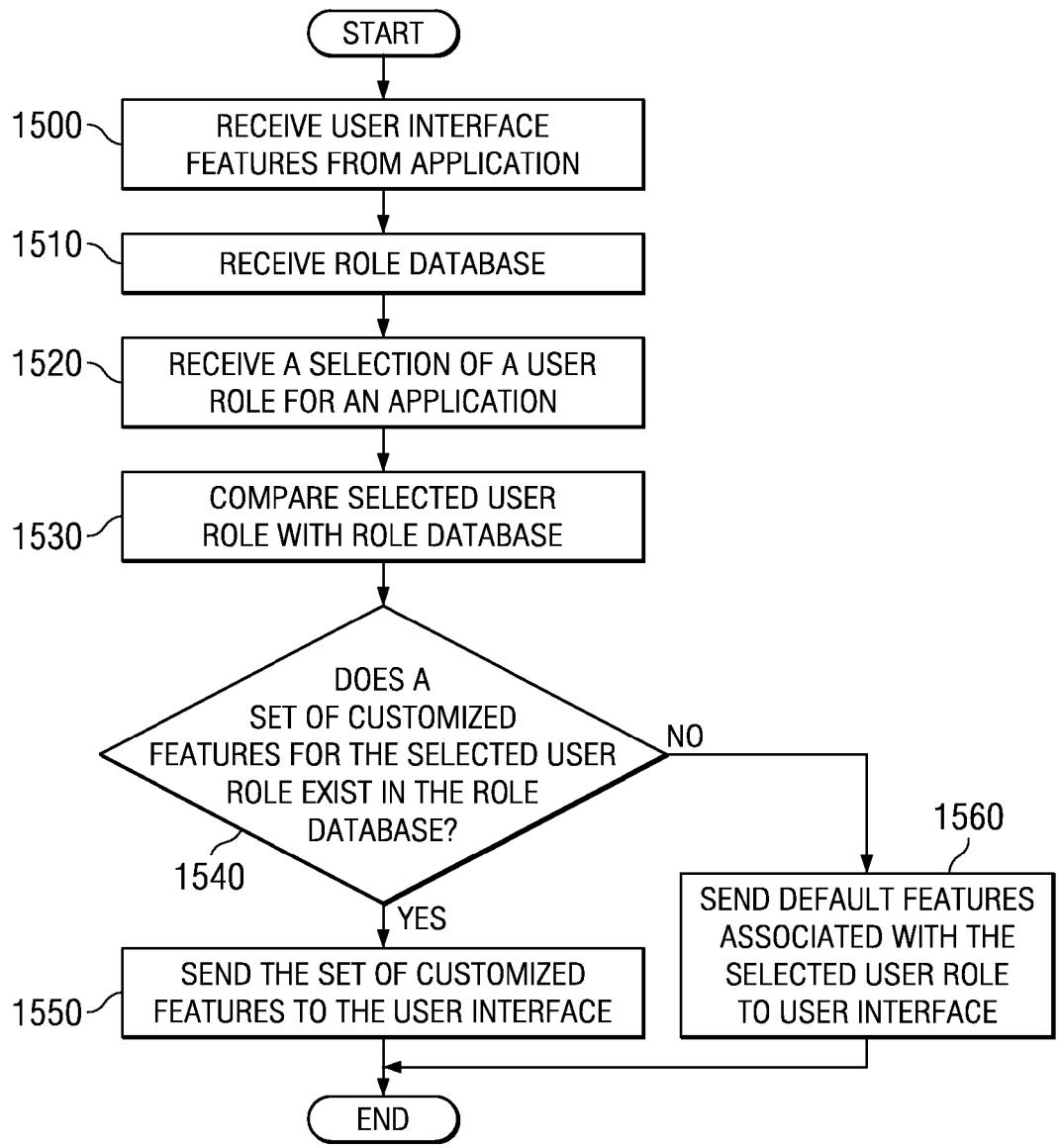

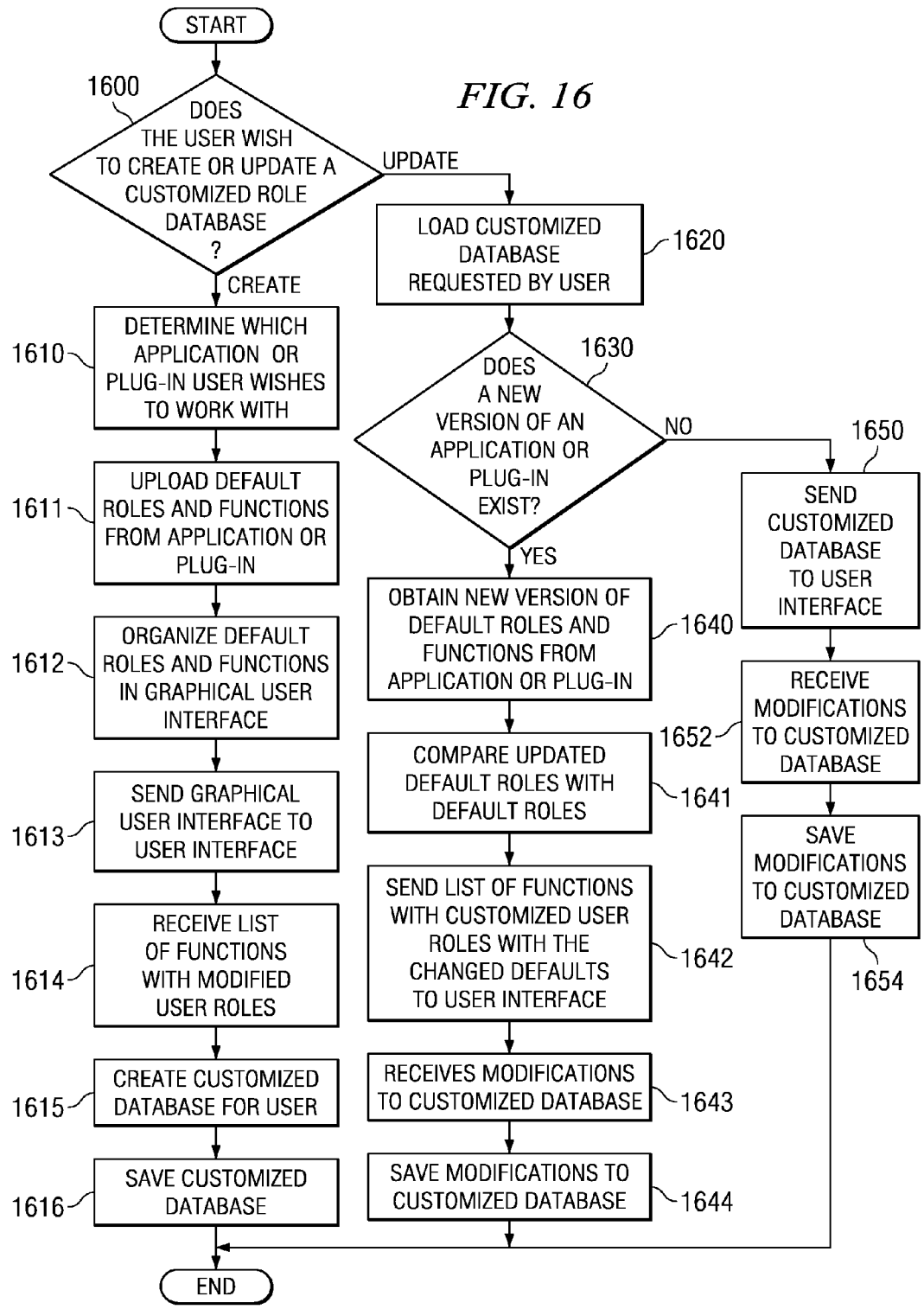

METHOD AND DATA PROCESSING SYSTEM FOR MANAGING USER ROLES

BACKGROUND OF THE INVENTION

1. Field of the Invention

The present invention relates generally to an improved data processing system and in particular to a method and apparatus for managing user roles. Still more particularly, the present invention relates to a computer implemented method, data processing system, and computer program product for managing user roles.

2. Description of the Related Art

Typically, a single application provides more functionality than most users require. As a result, many features in an application are rarely, if ever, used by an individual user. In some cases, only ten percent of the features within an application are ever used. Consequently, many features in an application only add clutter and take up space on a user's monitor without providing additional value to the user. The situation is exacerbated for applications that allow for extensions or plug-ins, as the number of features can grow without bounds depending on which extensions are installed.

In some applications, users are able to choose which features to display on their personal graphical user interface. A user may choose to display certain toolbars and not others. Other applications provide the user some ability to customize which buttons appear in the toolbars. However, in general, the user has either limited or no ability to customize the graphical user interface. Even when users do have the capability for some customization, the customization process is cumbersome and requires users to customize their graphical user interfaces in detail. As a result, little incentive exists for users to take advantage of the customizations.

Recently, several applications have made the process of customization easier. One application introduced the idea of turning on and off groups of functions. Another application introduced the idea of customizing based on the identified programming skill of a user. However, in both applications, users are still limited on the amount of customization which can be incorporated. In the described applications, developers of the application or plug-ins predetermine the functions that are within each group. The user typically does not have any control or input on the groupings of the functions. The user can only customized the available functions based on the predefined groupings, even if the groupings may not be exactly what is needed by the user. Furthermore, a user typically does not have the ability to share any of the changes and customizations with other users that may have the same needs as the user. As a result, the utility of the customization tools is still severely limited.

SUMMARY OF THE INVENTION

The illustrative embodiment provides a computer implemented method, a data processing system, and a computer program product for managing user roles. A customization application receives a request to modify a user role for an application. In response to the request, the customization application allows a user to modify a set of features associated with the user role to form a set of customized features. A role database stores the set of customized features for the user role. The user roles in the role database are available for use by a plurality of users of the application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 illustrates a diagram of a data processing system that includes a customization application and role database in accordance with an illustrative embodiment;

FIG. 4 is a diagram of the information contained in a typical role database in accordance with an illustrative embodiment;

FIG. 5 illustrates a user interface container and the user interface elements within the user interface container in accordance with an illustrative embodiment;

FIG. 9 illustrates a customization application in accordance with an illustrative embodiment;

FIG. 10 illustrates a graphical user interface for customizing default user roles in accordance with an illustrative embodiment;

FIG. 15 is a flowchart illustrating a process for providing identified features to a user in accordance with an illustrative embodiment; and FIG. 16 is a flowchart illustrating a process for customizing default user roles in accordance with an illustrative embodiment.

DESCRIPTION OF THE PREFERRED EMBODIMENT

Figure 1:
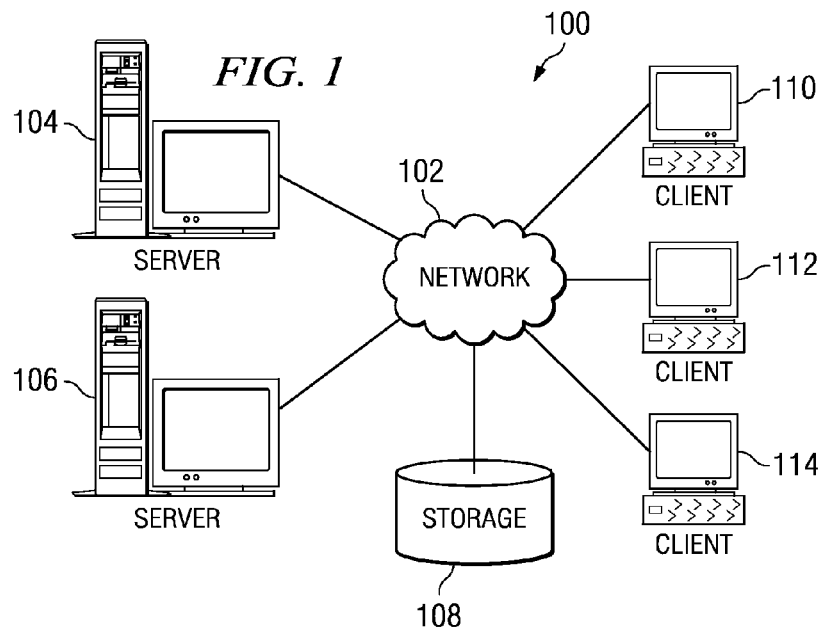
FIG. 1 is a pictorial representation of a network of data processing systems in which aspects of the illustrative embodiment may be implemented.
Figure 2:
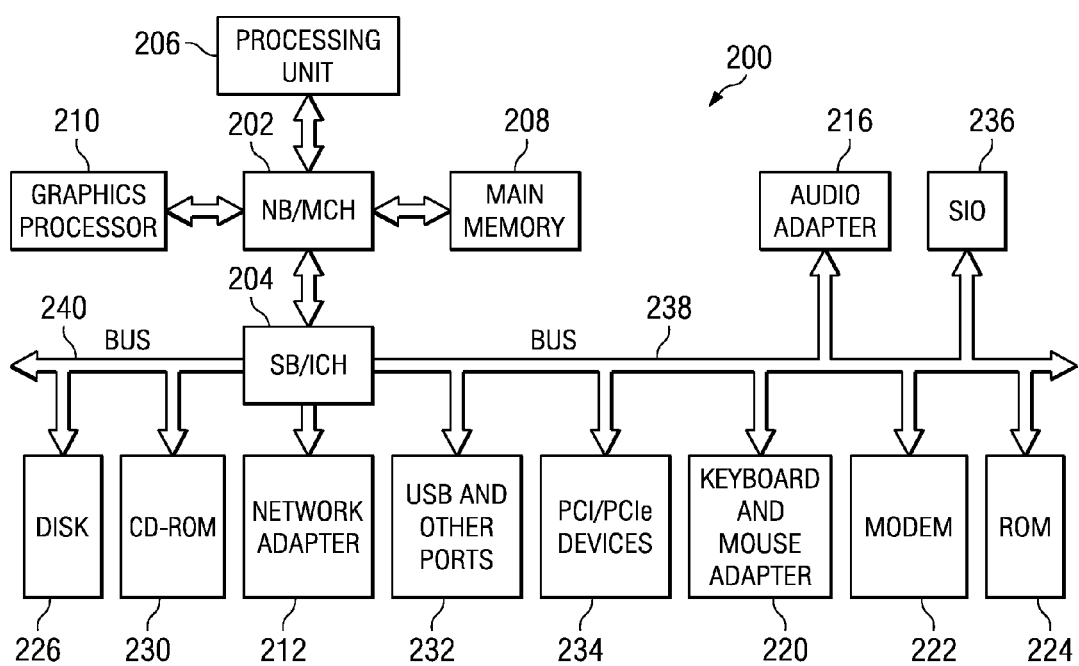
FIG. 2 illustrates a block diagram of a data processing system in which aspects of the illustrative embodiment may be implemented.

With reference now to the figures and in particular with reference to FIGS. 1-2, exemplary diagrams of data processing environments are provided in which embodiments of the illustrative embodiment may be implemented. It should be appreciated that FIGS. 1-2 are only exemplary and are not intended to assert or imply any limitation with regard to the environments in which the illustrative embodiment may be implemented. Many modifications to the depicted environments may be made without departing from the spirit and scope of the illustrative embodiment.

With reference now to the figures, FIG. 1 depicts a pictorial representation of a network of data processing systems in which the illustrative embodiment may be implemented. Network data processing system 100 is a network of computers in which embodiments of the illustrative embodiment may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the illustrative embodiment.

With reference now to FIG. 2, a block diagram of a data processing system is shown in which aspects of the illustrative embodiment may be implemented. Data processing system 200 is an example of a computer, such as server 104 or client 110 in FIG. 1, in which computer usable code or instructions implementing the processes for embodiments of the illustrative embodiment may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the illustrative embodiment are performed by processing unit 206 using computer program product, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiment may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, a data processing system, and a computer program product for managing user roles. A customization application receives a request to modify a user role for an application. In response to the request, the customization application allows a user to modify a set of features associated with the user role to form a set of customized features. A role database stores the set of customized features for the user role. The user roles in the role database are located in a local storage or a remote storage shared by a plurality of different users and is available for use by a plurality of users of the application.

FIG. 3 illustrates a diagram of a data processing system that includes a customization application and role database in accordance with an illustrative embodiment. Data processing system 300 is a computer or a server, such as data processing systems 200 of FIG. 2. Data processing system 300 includes user interface 310, framework 320, application 330, plug-in 340, and plug-in 342.

User interface 310 is any device that allows a user to interact with framework 320. Examples of user interface 310 include a video display monitor or a PDA display. Typically, users interact with user interface 310 using a keyboard or a mouse. Additionally, users typically work with various graphical user interfaces on user interface 310 to manage and control features within framework 320.

Framework 320 embodies program code that is loaded and resides in the main memory of data processing system 300. The main memory is similar to main memory 208 of FIG. 2. Framework 320 is a defined support structure in which another software application may be organized, developed, and deployed. Framework 320 allows developers to build an application on an existing platform rather than creating an application from the beginning. Framework 320 connects various components of a software project, such as support programs, code libraries, script language, or other software, to enable a user to build a new application. In these examples, framework 320 can be any software framework, such as a browser, the Eclipse™ software (a product managed by the Eclipse Foundation, Incorporated of Ottawa, Ontario, Canada), or the Rational® Application Developer software (Rational is a trademark of International Business Machines Corporation, in the United States, other countries, or both).

In the illustrative embodiment, framework 320 includes initialization code 350, role database 360, customization application 370, and user interface container 380. Initialization code 350 is an algorithm executed when a platform initializes or is turned on. Depending upon the implementation, initialization code 350 also initializes framework 320, application 330, plug-in 340, and plug-in 342, and role database 360. Initialization code 350 may also provide an opportunity for application 330, plug-in 340, and plug-in 342 to perform any necessary initialization tasks, such as initializing critical memory locations and starting software services. In the illustrative embodiment, initialization code 350 extracts information, such as user roles and the functions associated with the user roles, from application 330, plug-in 340, and plug-in and 342.

Application 330 is any software application, including a plug-in or extensible software. Application 330 is any software application that provides a large number of functions for a variety of user types and is built on top of framework 320. For example, any Microsoft® Office™ software (Microsoft is a trademark of Microsoft Corporation in the United States, other countries, or both) and many Eclipse™ based applications, such as Rational Application Developer, can be considered software applications with a large number of functions for a variety of user types. In the illustrative embodiment, application 330 is an individual software application.

Plug-ins 340 and 342 are software applications that support additional features within the original software application, such as application 330. For example, a plug-in may allow an integrated development tool to support a different programming language, provide additional fonts, support an animated movie, or extend the base of an internet browser by adding an additional toolbar. Other plug-ins may also further extend plug-ins 340 and 342.

In the illustrative embodiment, application 330, plug-in 340, and plug-in 342 each provides default user role information. The default user role information is information that is predefined and preprogrammed in application 330, plug-in 340, and plug-in 342. The default user role information includes a list of default user roles and the functions associated with each default user role. A user role is a role that can be adopted by a user and has a specific set of functions and responsibilities associated with the role. For example, some applications have a novice, intermediate, and advanced user role. In other applications, the user role may relate to the titles existing in an organization, such as business analyst, developer, or tester. In either situation, specific functions are associated with each user role type. For example, a novice user may only have access to view, save, and print an application, while an advanced user may have access to change and customize all components within the application. Likewise, a business analyst may have access to tools supporting the definition of business models and business processes, while a developer may have access to tools supporting the creation and modification of the algorithms associated with the application.

Typically, the provider of the application that a plug-in supports does not create the plug-in. Therefore, in some circumstances, the default user role information in an application may differ from the default user role information in a plug-in. However, in other circumstances, the default user role information in an application and plug-in may be the same. In the illustrative embodiment, application 330, plug-in 340, and plug-in 342 each provide a separate list of default user role information.

Initialization code 350 extracts the default user role information from within application 340, plug-in 340, and plug-in 342. The default user role information may be stored in a table, a flat file, an Extensible Markup Language (XML) file, a relational database management system, or any combination thereof. If the definitions for the default user role information are stored in a flat file or an Extensible Markup Language (XML) file, the initialization code 350 uses a text parsing method to extract the information. If the definitions for the default user role information are stored in a relational database management system, the appropriate Application Programming Interfaces (APIs) are used to extract the information. However, the illustrative embodiment is not limited to the described embodiment. One of ordinary skill in the art will recognize that other techniques for extracting information from application 330, plug-in 340, and plug-in 342 also exist.

After extracting the information, initialization code 350 sends the extracted default user role information to role database 360. Role database 360 is a repository that collects, stores, and reconciles user role information. Role database 360 can be a table, a flat file, an Extensible Markup Language (XML) file, a relational database management system, or any combination thereof.

Role database 360 contains two sets of user role information: default and customized. In general, in the illustrative embodiment, application 330, plug-in 340, and plug-in 342 provide the default user role information. Initialization code 350 extracts the default user role information from application 330, plug-in 340, and plug-in 342. Role database 360 accepts the default user role information from initialization code 350.

Role database 360 accepts customized user role information from customization application 370. Customized user role information is any previously modified default user role information. The modification may be to the original default user role information, to default user role information already modified by a user, or any newer version of the default user role information. Modified default user role information is any information in which a user changed, such as added information, deleted information, or information that is associated with another user role. A customization is any modification to the default user role information.

The illustrative embodiment provides that the customized user role information may include customized user role information only, default user role information only, or a combination of customized and default user role information. The type of information included in the customized user role information depends upon the amount of information that a user modifies. If a user does not modify any of the default user role information, then role database 360 copies and saves the default user role information as the customized user role table. If a user modifies all the default user role information, then the customized user role information includes only the modifications made by the user. If, however, a user only modifies some of the default user role information, then the customized user role information will include both the modified information as well as the default user role information that remained unchanged.

In an alternative embodiment, the customized user role information may not exist at all if a user does not modify any of the default user role information. Thus, instead of copying the default user role information into customized user role information, only the default user role information will exist in role database 360. One of ordinary skill in the art can easily adapt role database 360 to include only the default user role information. In the illustrative embodiment, role database 360 copies the default user role information into the customized user role information.

The illustrative embodiment also allows role database 360 to be updated with new default user role information. Updates of default user role information will occur when a newer version of application 330, plug-in 340, or plug-in 342 interacts with data processing system 300. If a newer version of application 330, plug-in 340, or plug-in 342 is introduced, the customized user role information is updated and merged with the updated default user role information.

Initialization code 350 manages the updated information from application 330, plug-in 340, and plug-in 342. Initialization code 350 compares the default user role information from application 330, plug-in 340, and plug-in 342 with the default user role information stored in the role database 360. The default user role information stored in role database 360 is the information residing in role database 360 since the last time application 330, plug-in 340, and plug-in 342 interacted with data processing system 300. The default user role information from application 330, plug-in 340, and plug-in 342 is the present or updated version of the default user role information.

If initialization code 350 determines that additional default user role information exists in the updated version of application 330, plug-in 340, or plug-in 342, initialization code 350 adds the new information to the customized user role information in role database 360. For default user role information that is deleted or no longer existing in application 330, plug-in 340, or plug-in 342, initialization code 350 removes the corresponding default entries from the customized user role information in role database 360. For functions whose user role associations have changed, initialization code 350 will first determine if a user previously modified the user role association with that function. To determine whether the user role was modified, initialization code 350 first compares the customized user role information in the role database 360 with the default user role information stored in role database 360. If the customized user role information is the same as the default user role information in role database 360, then no modification occurred for the particular function. In that circumstance, initialization code 350 deletes and replaces the corresponding entries in the customized user role information with the updated user role information from application 330, plug-in 340, or plug-in 342. However, if the customized user role information differs from the default user role information in role database 360, then initialization code 350 retains the customized user role information, and role database 360 sends a message to the user indicating that a different or updated version of application 330, plug-in 340, and plug-in 342 is available.

In an alternative embodiment, initialization code 350, instead of role database 360, can send a message to the user indicating that a different or updated version of application 330, plug-in 340, or plug-in 342 is available. In yet another embodiment, initialization code 350 may send a message to user interface container 380 and allow user interface container 380 to contact the user regarding the changes.

Once the user receives the message, the user, through user interface 310, is given the opportunity to determine whether to retain the customized user role information or replace the customized user role information with the updated default user role information. A user may also choose to further modify the updated user role. Role database 360 adds the information to the customized user role information.

After the customized user role information is updated, the default user role information stored in role database 360 is replaced with the updated default role information. The updated default user role information is used when application 330, plug-in 340, or plug-in 342 is updated in future.

In an alternative embodiment, customization application 370 may manage the updated information. In this embodiment, customization application 370 will first import the default user role information from role database 360 and the updated default user role information from application 330, plug-in 340, or plug-in 342. Customization application 370 will then compare the default user role information from role database 360 with the default user role information from application 330, plug-in 340, or plug-in 342. Customization application 370 will then use a similar process for updating the old default and customized user role information. After updating the user role information, customization application 370 will then send the updated information to role database 360. Role database 360 will then replace the old user role information with the new user role information.

A user can create customized user role information using customization application 370. Typically, any user, whether an individual user or a system administrator, can modify the default user roles. Once customized user role information is created, a user can share the customized user role information with other users.

Role database 360 sends customized user information to user interface container 380. User interface container 380 stores, manages, and determines which features are displayed to a user on user interface 310. In the illustrative embodiment, user interface container 380 includes features 382 and 384. A feature is a graphical representation of a function from a particular software application, such as application 330, plug-in 340, and plug-in 342. A feature is typically displayed on a graphical user interface. Examples include a save document icon, a views toolbar, or a command menu. In the illustrative embodiment, feature 382 is a views toolbar and feature 384 is an icon for compiling a program. However, user interface container 380 is not limited to the illustrative embodiments. User interface container 380 may contain more or less features with each feature representing a plurality of functions.

In use, user interface container 380 receives a communication from the user at user interface 310 on what role the user is requesting. The user role can be pre-determined prior to platform initialization or is dynamically specified by the user at user interface 310. A user role is dynamically specified if the user role is specified at any time after the platform is initialized. Before user interface 310 is displayed to the user, the information in role database 360 is sent to user interface container 380. Application 330, plug-in 340, and plug-in 342 also sends all available features to user interface container 380. User interface container 380 then matches the features with the functions listed in role database 360 for a particular role. Only the features associated with functions that are relevant for the user role specified by the user are then sent to user interface 310 for use with application 330, plug-in 340, and plug-in 342.

FIG. 4 is a diagram of the information contained in a typical role database in accordance with an illustrative embodiment. The role database may be implemented as role database 360 of FIG. 3. The role database can be a table, a flat file, an Extensible Markup Language (XML) file, a relational database management system, or any combination thereof. In the illustrative embodiment, the role database is a table.

In the illustrative embodiment, the role database includes customized user roles table 400 and default user role table 440. Customized user roles table 400 is a table created by a user for the application. A user utilizes a customization application, such as customization application 370 of FIG. 3, to create a table, such as customized user roles table 400. Default user roles table 440 is a table of the default user roles and the associated functions for the default user roles. Default user roles table 440 is provided by a particular version of an application or plug-in, such as application 330, plug-in 340, and plug-in 342 of FIG. 3. Customized user role table 400 is typically based upon the information provided by default user roles table 440.

Customized user roles table 400 includes user role column 410, user interface feature column 412, plug-in column 414, and plug-in version column 416. User role column 410 contains entries of the user roles that are customized from a list of default user roles. User interface feature column 412 is a list of functions the user has designated for each user role. In the illustrative embodiment, user interface feature column 412 is a list of menu items available for each user role. In other embodiments, user interface feature column 412 may include a list of perspectives or views available to each user role. Plug-in column 414 lists from which plug-in user interface feature 412 originates. Plug-in version column 416 lists the version of the plug-in listed in plug-in column 414 that supplies the function listed in the user interface feature column.

Each row in the rows 420 through 430 represents an association between a user role and a function. In other words, the function listed in the row is associated with the user role specified in the row. In the illustrative embodiment, row 420 shows that a user in the architect user role has an associated impact analysis function. The impact analysis function is provided by the program analysis plug-in, version 6.0.1. Row 422 illustrates a user in the developer user role that has an associated function to run unit test. The run unit test function is provided by the test plug-in, version 6.0.1. Row 424 demonstrates a Java™ developer with an associated function of Java™ compile. The Java™ compile function originates from Java™ plug-in, version 6.0.1.2. Rows 426 through 428 depicts a developer for a Java™ Platform, Enterprise Edition, also known as a J2EE developer, with associated functions to deploy and build Enterprise Java™Beans (EJB). The functions originate from Java™ Platform, Enterprise Edition (J2EE) plug-in, version 6.0.1.1. Row 430 illustrates a deployer with an associated function to build Enterprise Java™Beans (EJB). The function originates from Java™ Platform, Enterprise Edition, version 6.0.1.1. In an alternative embodiment, a given user role in customized user roles 410 or user interface feature in user interface feature column 412 may appear in multiple rows in customized user role table 400, as a user role can be associated with many user interface features and a user interface feature may be associated with many user roles.

Default user roles table 440 is similar to customized user roles table 400, except that each entry in default user role table 440 contains the default user role and the default functions associated with the user role as provided by a particular application or plug-in. Default user roles table 440 includes user roles column 450, user interface feature column 452, plug-in column 454, and plug-in version column 456. User roles column 450 contains entries for all the default user roles. The default user roles are pre-defined by an application and the installed plug-ins. User interface feature column 452 are the default functions associated with the user roles listed in user role column 450. In the illustrative embodiment, user interface feature column 452 is a list of menu items available for each user role. Plug-in column 454 lists the plug-in from which the function in the user interface feature column 452 originates. Plug-in version column 456 lists the version of the plug-in listed in plug-in column 454 that supplies the function listed in the user interface feature column 452.

Rows 460 through 468 show the default functions associated with each default user role. Row 460 indicates that the impact analysis function is associated with the architect user role. The user role and the associated functions are provided and defined by program analysis plug-in, version 6.0.1. Row 462 shows the developer role associated with the run unit test function. The user role and the associated functions are provided and defined by test plug-in, version 6.0.1. Row 464 demonstrates the Java™ developer associated with the Java™ compile function, with the function originating from the Java™ plug-in, version 6.0.1.2. Row 466 shows the developer for the Java™ Platform, Enterprise Edition (J2EE) associated with to build Enterprise Java™Beans (EJB). The user role and the associated function are provided and defined by Java™ Platform, Enterprise Edition, plug-in, version 6.0.1.1. Row 468 illustrates the deployer user role associated with the function to deploy Enterprise Java™Beans (EJB). The user role and the associated functions are provided and defined by Java™ Platform, Enterprise Edition, plug-in, version 6.0.1.1.

Customized user role table 400 is used by a user interface container, such as user interface container 380 of FIG. 3, to determine the user interface features that should appear in a user interface, such as user interface 310 of FIG. 3. Default user roles table 440 is used in conjunction with the customized user role table 400 to determine exactly which user roles and associated functions are customized. To determine which rows are customized, an algorithm, executed in the processor of a data processing system, compares the information in rows 420 through 430 against the information in rows 460 through 468. The information that is different indicates the user roles that are customized. For example, in the illustrative embodiment, the Impact Analysis feature in row 420, Run Unit Test feature in row 422, and Java™ Compile feature in row 424 correspond with the same user default user roles in corresponding rows 460, 462, and 464. Therefore, the architect, developer, and Java™ developer user roles are not customized in customized user role table 400. On the other hand, Enterprise Java™Bean (EJB) Deploy is associated with the Java™ Platform, Enterprise Edition (J2EE) Developer role in customized user role table 400. Similarly, the Enterprise Java™Bean Build role is associated with both the Java™ Platform, Enterprise Edition (J2EE) Developer role and the Deployer role in customized user role table 400. The same associations do not exist in default user role table 400. For example, rows 466 and 468 do not show the same associations. Therefore, in the illustrative embodiment, Java™ Platform, Enterprise Edition (J2EE) Developer role and the Deployer are customized user roles.

The illustrative embodiments are not limited to the depicted example. For example, a customized user role can be associated with multiple user interface features. Additionally, the same user interface feature can be associated with multiple user roles. Moreover, one of ordinary skill in the art will recognize other methods for comparing two sets of information.

FIG. 5 illustrates a user interface container and the user interface elements within the user interface container in accordance with an illustrative embodiment. The user interface container is similar to user interface container 380 of FIG. 3. The user interface container determines which features to display to a user based upon the role selected by a user.

In the illustrative embodiment, the user interface container includes the features listed in table 500. A feature is the graphical representation of a function, typically displayed as a graphical user interface. Examples of a user interface feature include menu items, views and perspectives. In the illustrative embodiment, table 500 illustrates user role 510 and the available perspective 512, view 514, and menu 516 features for the user role. The determination of which features are available to a user is based upon information contained in a role database. The role database gathers and lists all the user roles and the functions associated with the user roles.

The user interface container takes the information from the role database and translates the functions into a feature. The features are provided to the user interface container directly by an application or plug-in. The association of the function to the feature is typically encoded within the application or plug-in. The association may also be described as a text file, database, or any other similar format within an application or plug-in. If the information for the specified user role is modified in the role database, the user interface container presents a set of customized features to the user. If the information in is not modified, the user interface container presents a set of default features to the user.

In the illustrative embodiment, perspective 512 is the predefined layout of user interface features that are intended to support particular tasks and are available to a user in the corresponding user roles listed in the user role column 510. View 514 is the type of view available within each perspective available to a user in user role 510. Menu 516 is a list of the menus that will be displayed to a user in user role 510. Rows 520 through 528 illustrate the available features for each user role.

In these illustrative examples, the architect user role described in rows 520 and 522 can choose between the business model and the Unified Modeling Language (UML) perspectives. For the architect in the business model perspective, shown in row 520, the displayed features are a class diagram, a sequence diagram, and an impact analysis menu. For the architect in the unified modeling language perspective, shown in row 522, the displayed features are a class diagram, a sequence diagram, and an impact analysis menu. For the developer user role, shown in row 524, the displayed features are a unit test perspective, sequence diagram, unit test view, and run unit tests menu. For the Java™ developer, shown in row 526, the displayed features are a Java™ perspective, Java™ source editor view, and Java™ compile menu. For the Java™ Platform, Enterprise Edition (J2EE) developer, shown in row 528, a Java™ Platform, the displayed features are Enterprise Edition (J2EE) perspective, Java™ Platform, Enterprise Edition (J2EE) server view, and a Enterprise Java™Beans (EJB) build and deploy menu.

The illustrative embodiments are not limited to the depicted example. More or less features and user roles may also be included in the user interface container. Additionally, the features illustrated may be modified to match other user roles not illustrated in the depicted example.

Figure 6:
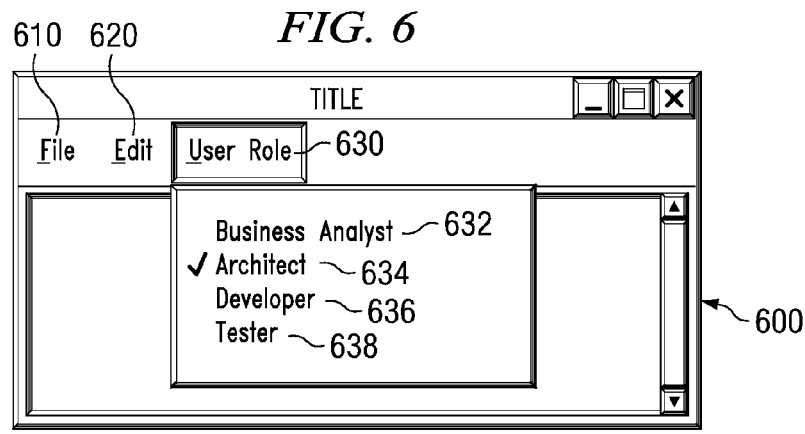
FIG. 6 illustrates an example graphical user interface for selecting a user role in accordance with an illustrative embodiment.

FIG. 6 illustrates an example graphical user interface for selecting a user role in accordance with an illustrative embodiment. Graphical user interface 600 may be displayed on a user interface, such as user interface 310 of FIG. 3.

In the illustrative embodiment, graphical user interface 600 includes file menu 610, edit menu 620, and user role menu 630. User role menu 630 lists the customized list of user roles for the specific user. In the illustrative embodiment, user role menu 630 lists four user roles: business analyst 632, architect 634, developer 636, and tester 638. In another embodiment, user role menu 630 may list different user roles, such as novice, expert, or guru. In the illustrative embodiment, the user selects to operate in architect 634 user role.

In the illustrative embodiment, graphical user interface 600 is a menu displayed after the user initializes the data processing system. The user selects a user role in graphical user interface 600 after initialization. In another embodiment, the role of the user may be automatically designated prior to the data processing system initializes. In yet another illustrative embodiment, the role of the user may be determined at the time the user signs into a data processing system.

Figure 7:
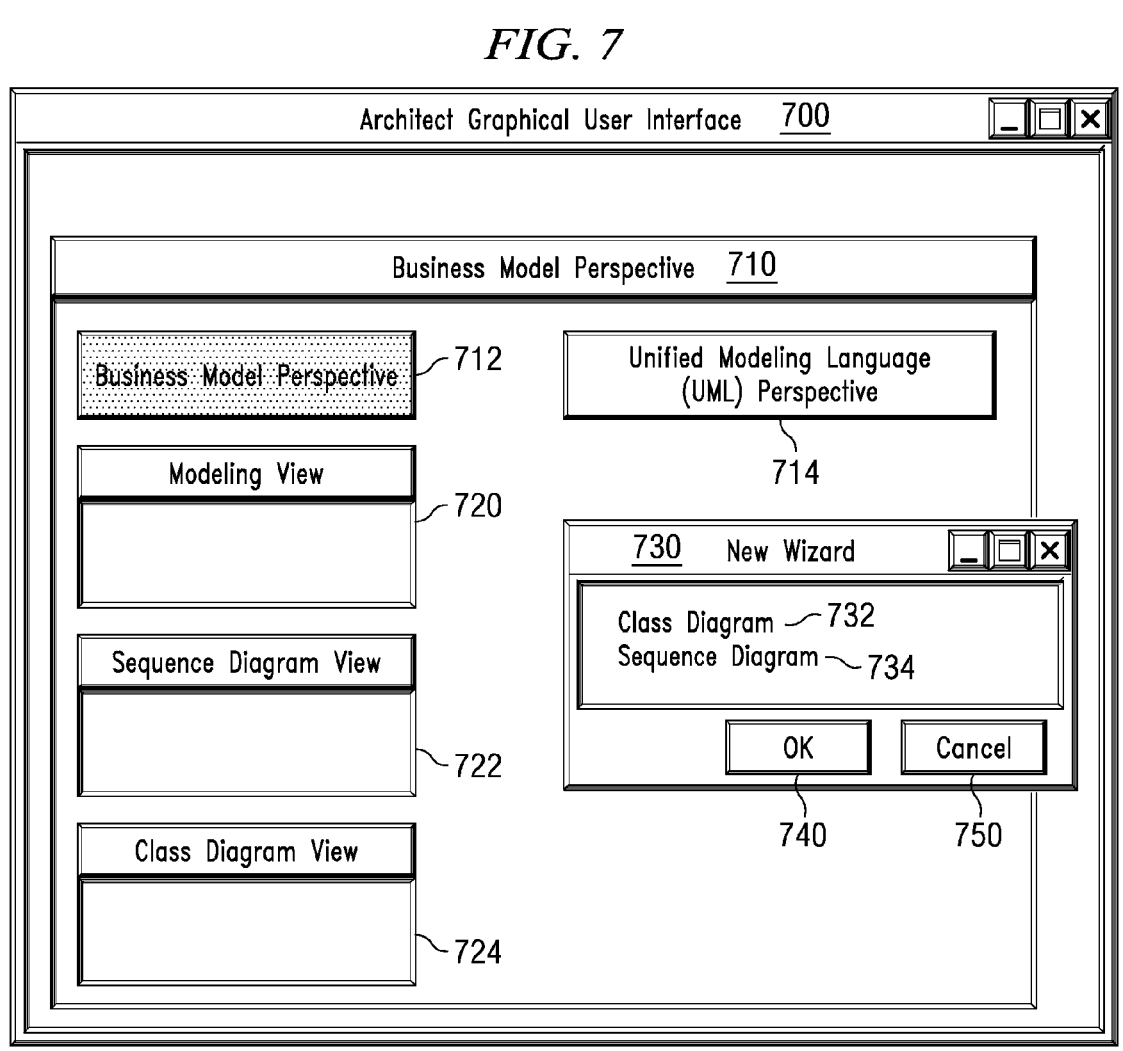
FIG. 7 illustrates an example graphical user interface for a user in the architect user role in accordance with an illustrative embodiment.

FIG. 7 illustrates an example graphical user interface for a user in the architect user role in accordance with an illustrative embodiment. Architect graphical user interface 700 may be displayed on a user interface, such as user interface 330 of FIG. 3. The features displayed on architect graphical user interface 700 are determined by a user interface container, such as user interface container 380 of FIG. 3. The features for each user role are determined by a role database, such as role database 360 of FIG. 3.

In the illustrative embodiment, architect graphical user interface 700 includes two windows: business model perspective window 710 and new wizard window 730. In the illustrative embodiment, business model perspective window 710 contains two types of user interface features: perspectives and views. The perspectives available are business model perspective 712 and Unified Modeling Language (UML) perspective 714. In the illustrative embodiment, a user can select a perspective by selecting the business model perspective 712 or Unified Modeling Language (UML) perspective 714. In the illustrative embodiment, the user selected business model perspective 712.

Business model perspective window 710 also includes modeling view 720, sequence diagram view 722, and class diagram view 724. In the illustrative embodiment, the listed views are only visible when business model perspective 712 is selected. Thus, a different set of views will be displayed if Unified Modeling Language (UML) perspective 714 is selected.

New wizard window 730 is a dialog window that provides a user with the opportunity to create a new file, such as new class diagram 732 or new sequence diagram 734. New wizard window 730 is a separate feature defined by a user interface container, such as user interface container 380 of FIG. 3. Within new wizard window 330, a user can select class diagram feature 732 and sequence diagram feature 734. New wizard window 730 also includes "OK" button 740 and "Cancel" button 750. "OK" button 740 allows a user to accept the feature selected in new wizard 730. "Cancel" button 750 allows a user to abort a selection.

Architect graphical user interface 700 is not limited to the illustrative embodiment. For example, an "OK" and "cancel" button may also exist in business model perspective 710. Additionally, depending upon the amount of customization, architect graphical user interface 700 may have more or less windows and features within each window. Architect graphical user interface 700 may also vary depending on the defaults provided by the application or plug-in. Architect graphical user interface 700 is provided for illustrative purposes only and not meant to limit the illustrative embodiment.

Figure 8:
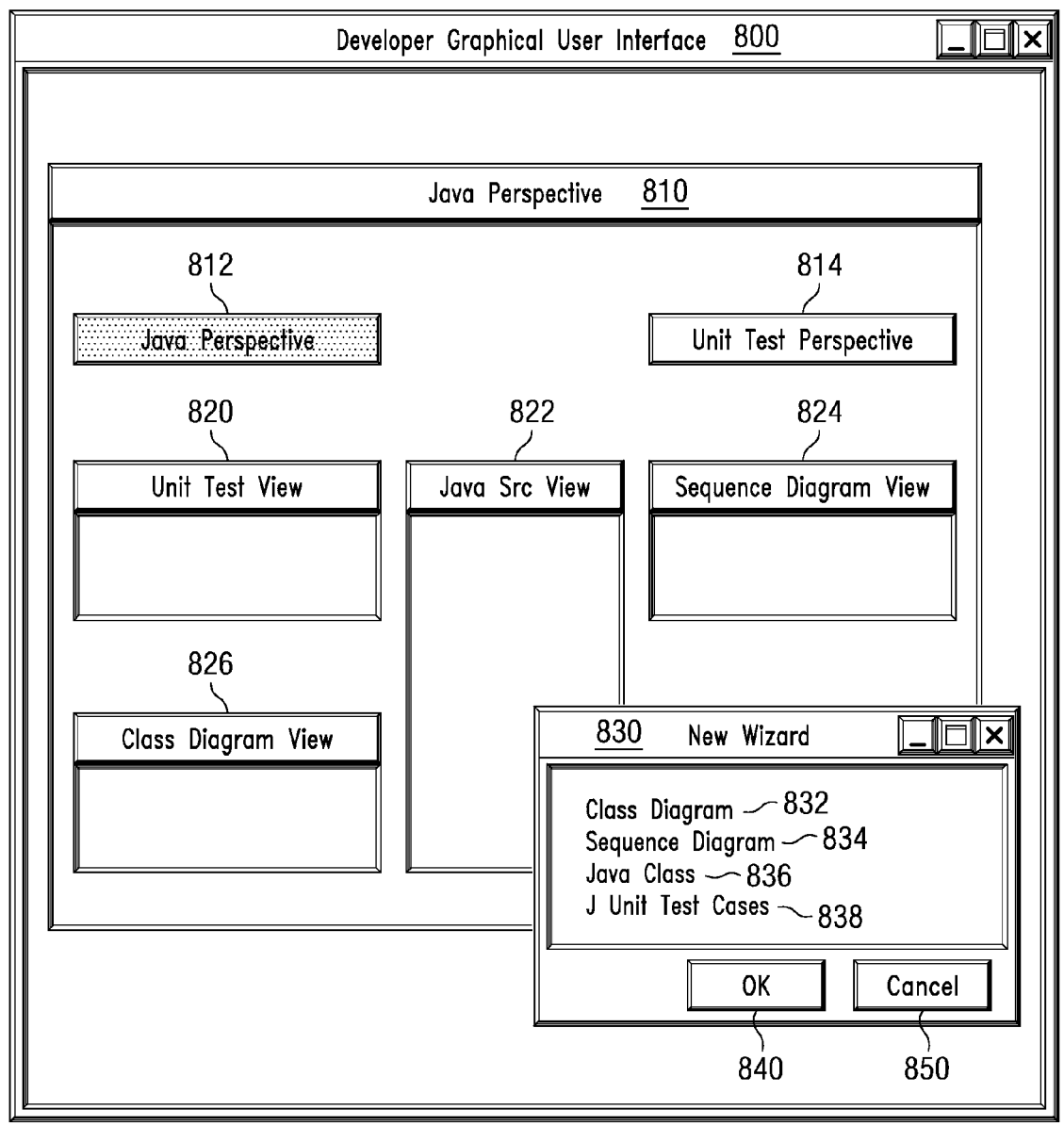
FIG. 8 illustrates an example graphical user interface for a user in the developer user role in accordance with an illustrative embodiment.

FIG. 8 illustrates an example graphical user interface for a user in the developer user role in accordance with an illustrative embodiment. Developer graphical user interface 800 may be displayed on a user interface, such as user interface 330 of FIG. 3. Developer graphical user interface 800 is similar to architecture graphical user interface 700 of FIG. 7. However, developer graphical user interface 800 provides an alternative embodiment of what features may be available to a developer and demonstrates how different user interface features would appear based upon different user roles.

In the illustrative embodiment, developer graphical user interface 800 includes two windows: Java™ perspective window 810 and new wizard window 830. In the illustrative embodiment, Java™ perspective window 810 contains two types of user interface features: perspectives and views. The perspectives available are Java™ perspective 812 and unit test perspective 814. In the illustrative embodiment, both perspectives are buttons and a user can select a perspective by selecting a button. In the illustrative embodiment, the user selected Java perspective 812.

Java™ perspective window 810 also includes unit test view 820, Java™ source view 822, sequence diagram view 824, and class diagram view 826. In the illustrative embodiment, the listed views are only visible when Java™ perspective 812 is selected. Thus, a different set of views will be displayed if unit test perspective 814 is selected.

New wizard window 830 is a dialog window that provides a user with the opportunity to create a new file, such as new class diagram 832, new sequence diagram 834, Java™ class 836, or J unit test cases 838. New wizard window is a separate feature defined by a user interface container, such as user interface container 380 of FIG. 3. New class diagram 832, new sequence diagram 834, Java™ class 836, or J unit test cases 838 are features that can be selected by a user. New wizard window 830 also includes "OK" button 840 and "Cancel" button 850. "OK" button 840 allows a user to accept the feature selected in new wizard 830. "Cancel" button 850 allows a user to abort a selection.

Developer graphical user interface 800 is not limited to the illustrative embodiment. Depending upon the amount of customization, developer graphical user interface 800 may have more or less windows and choices within each window. Developer graphical user interface 800 may also vary depending on the defaults provided by the application or plug-in. Developer graphical user interface 800 is provided for illustrative purposes only and not meant to limit the illustrative embodiment.

FIG. 9 illustrates a customization application in accordance with an illustrative embodiment. Customization application 900 is an application that enables a user to create a customized database. Customization application 900 is similar to customization application 370 of FIG. 3.

In the illustrative embodiment, customization application 900 includes customized role database 910, default roles and functions 920, algorithm to create customization 930, and algorithm to update database 940. A user interacts with user interface 950, often through the use of a keyboard or mouse, to create customized role database 910. Customized role database 910 is the database of user roles and associated functions created by a user using customization application 900. Customized role database 910 can be a table, a flat file, an Extensible Markup Language (XML) file, a relational database management system, or any combination thereof. Customized user role table 400 of FIG. 4 is an illustrative embodiment of customized role database 910.

Customization application 900 reads the default roles and functions 920 from the application and the plug-ins. Default roles and functions 920 is a list of user roles and associated functions residing in an application or plug-in. To create customized role database 910, a user modifies or changes the default roles and functions. For example, a user may modify which function is associated with a particular user role or delete a particular function for a user role. In another embodiment, a user may choose to change the names of the default role or function to match the roles within a business organization. Each modification and change is saved and eventually forms customized role database 910. The user can further modify any customized database as often as desired.

Algorithm to create customization 930 is a computer implemented process code for enabling a user to create customized role database 910. Algorithm to create customization 930 provides the tools and interfaces to change default roles and functions 920.

Algorithm to update database 940 is a computer implemented process code for enabling a user to modify an already existing role database. The modification may be based simply on the desire of a user to modify the role database, or based on the existence of an updated version of an application or plug-in. If an updated version of an application or plug-in exists, algorithm to update database 940 enables a user to modify customized role database 910 according to the changes in the updated version or allow the user to retain the original customizations. The illustrative embodiment provides a mechanism for algorithm to update database 940 to notify the user of a change because of an updated version of an application or plug-in.

FIG. 10 illustrates a graphical user interface for customizing default user roles in accordance with the illustrative embodiment. Customize user roles window 1000 is an example interface that a user may use to modify default user roles within an application or plug-in. Customize user roles window 1000 is the interface used in conjunction with a customization application, such as customization application 370 of FIG. 3 or customization application 900 of FIG. 9.

Customize user roles window 1000 includes user role view 1010 and functions view 1020. In the illustrative embodiment, user role view 1010 shows two types of developer 1012 roles which may be customized by a user: COBOL role 1014 or Java™ role 1016. In the illustrative embodiment, the user selected to modify Java™ role 1016.

In the illustrative embodiment, functions view 1020 enables a user to customize current functions 1021 associated with a particular user role. Current function 1021 lists build function 1022 and display function 1023 as the functions currently associated with Java™ developer role 1016. To add a function to current function 1021, a user selects add function button 1024 which in turn displays a list of additional functions that may be associated with Java™ developer role 1016. The list of additional functions is provided by the specific application and installed plug-ins that the user is currently customizing. To remove a function from current function 1021, the user selects remove function button 1025.

"Export" button 1030 allows a user to share the customizations with another user. "OK" button 1040 saves the changes made by the user in customize user roles windows 1000. "Cancel" button 1050 erases the changes made by a user to customize user roles window 1000.

Figure 11:
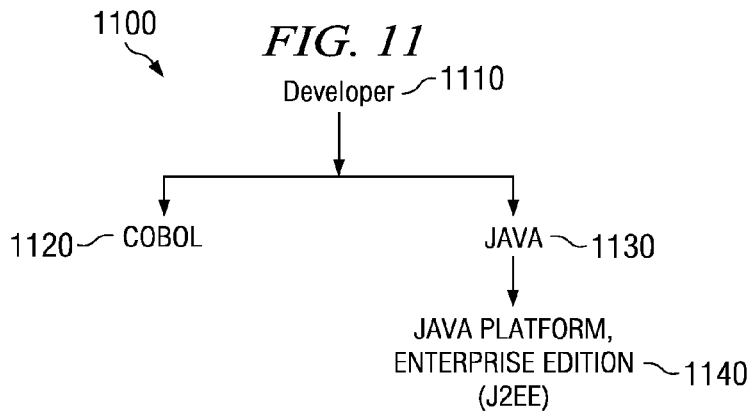
FIG. 11 illustrates a hierarchy of user roles in accordance with an illustrative embodiment.

FIG. 11 illustrates a hierarchy of user roles in accordance with an illustrative embodiment. Hierarchy 1100 is stored in a role database, such as role database 360 of FIG. 3. Hierarchy 1100 is utilized when determining whether a function is associated with a user role. Hierarchy 1100 may be displayed in a graphical user interface, such as customize user roles window 1000 of FIG. 10. In the illustrative embodiment, hierarchy 1100 has three levels. Developer 1110 is in the first level of hierarchy 1100, COBOL 1120 and Java™ 1130 are in the second level, and Java™ Platform, Enterprise Edition (J2EE) 1140 is in the third level. A user role in a lower level of hierarchy 1100 inherits the functions of a user role in a higher level of hierarchy 1100. Thus, in the illustrative embodiment, the COBOL 1120 and Java™ 1130 user roles inherits the functions of developer 1110. Likewise, Java™ Platform, Enterprise Edition (J2EE) 1140 inherits the functions of Java™ 1130.

To inherit a function means to adopt the functions associated with a particular user role. For example, COBOL user role 1120 includes individual functions associated with COBOL user role 1120 plus functions associated with developer user role 1110. Similarly, Java™ user role 1130 includes individual functions associated with Java™ user role 1130 plus functions associated with developer user role 1110. Likewise, Java™ Platform, Enterprise Edition (J2EE) user role 1140 includes individual functions associated with Java™ Platform, Enterprise Edition (J2EE) user role 1130 plus functions associated with Java™ user role 1130. Since Java™ user role 1130 also include functions from developer user role 1110, then Java™ Platform, Enterprise Edition (J2EE) user role 1140 also includes functions associated with developer user role 1110.

Hierarchy 1100 simplifies the definition and customization of a user by allowing a user role to inherit the functions of another user role. The ability to inherit functions allows a user to create a customized user database with user roles that build upon previous user roles. The inherit function allows a user to pick groups of functions to adopt rather than requiring the user to choose from a list of individual functions each time the user customizes a user role. The inherit function is a mechanism to efficiently create a customized user database. Furthermore, any customizations done to a user role in a higher level will automatically be inherited by the lower level user roles. The automatic inheritance feature further simplifies the customization process.

Figure 12:
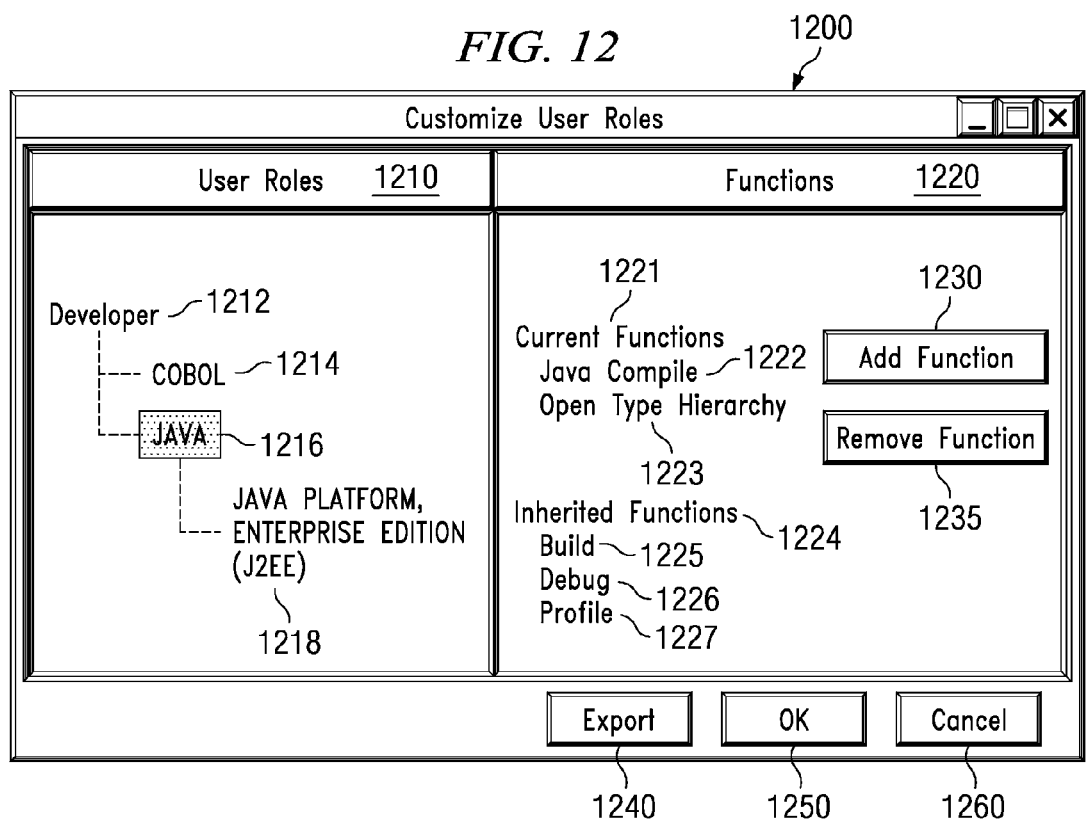
FIG. 12 illustrates a graphical user interface for customizing default user roles that utilizes a hierarchy of user roles in accordance with an illustrative embodiment.

FIG. 12 illustrates a graphical user interface for customizing default user roles that utilizes a hierarchy of user roles in accordance with an illustrative embodiment. Customize user roles window 1200 is the interface used in conjunction with a customization application, such as customization application 370 of FIG. 3 or customization application 900 of FIG. 9. Customize user roles window 1200 is similar to customize user roles window 1000 of FIG. 10, except customize user roles window 1200 shows a hierarchy of user roles, such as hierarchy 1100 of FIG. 11.

Customize user roles window 1200 includes user roles view 1210 and functions view 1220. In the illustrative embodiment, user role view 1210 shows three types of developer 1212 roles which may be customized by a user: COBOL role 1214, Java™ role 1216, and Java™ Platform, Enterprise Edition (J2EE) role 1218. In the illustrative embodiment, user role view 1210 is structured in a hierarchy of user roles. Developer role 1212 is the first level, COBOL role 1214 and Java™ role 1216 are in the second level, and Java™ Platform, Enterprise Edition (J2EE) role 1218 is in the third level. COBOL role 1214 inherits the functions for developer role 1212. Similarly, Java™ role 1216 inherits the functions for developer role 1212. Java™ Platform, Enterprise Edition (J2EE) role 1218 inherits the functions for Java™ role 1216. Since Java™ Platform, Enterprise Edition (J2EE) role 1218 inherits functions from Java™ role 1216, Java™ Platform, Enterprise Edition (J2EE) role 1218 also inherits the functions from developer role 1212. In the illustrative embodiment, the user chooses to modify Java™ role 1216.

In the illustrative embodiment, functions view 1220 allows a user to modify current function 1221. Current function 1221 lists Java™ compile function 1222 and open type hierarchy function 1223 as the functions currently associated with Java™ developer role 1216. To add a function to current function 1221, a user selects add function button 1230 which in turn displays a list of additional functions that may be associated with Java™ developer role 1216. The list of additional functions is provided by the specific application or plug-ins that the user is currently customizing. To remove a function from current function 1221, the user selects remove function button 1235.

Inherited functions 1224 lists the functions inherited by Java™ role 1216. In the illustrative embodiment, Java™ role 1216 inherits the functions of developer role 1212. Thus, inherited functions 1224 are the functions associated with developer role 1212. In the illustrative embodiment, inherited functions include build function 1225, debug function 1226, and profile function 1227. Each of the functions in inherited function 1224 are available to the developer role 1212, the Java™ role 1216, and the Java™ Platform, Enterprise Edition (J2EE) role 1218 which inherits from the Java™ role 1216. Through the inheritance process, if the user customizes the functions for developer role 1212, the modifications will be reflected in inherited functions 1224 when the user chooses to customize Java™ role 1216. Similarly, if the user customizes the functions for the Java role 1216, the modifications will be reflected in the inherited functions of the Java Platform, Enterprise Edition role 1218.

"Export" button 1240 enables a user to share the customizations with another user. "OK" button 1250 saves the changes made by the user in customize user roles windows 1200. "Cancel" button 1260 erases the changes made by a user to customize user roles window 1200.

The illustrative embodiments are not limited to the depicted example. Other features may be included in or removed from the graphical user interface. Additionally, alternative embodiments of the illustrative embodiment could allow the user to share and access customized user roles 1200 with multiple users.

Figure 13:
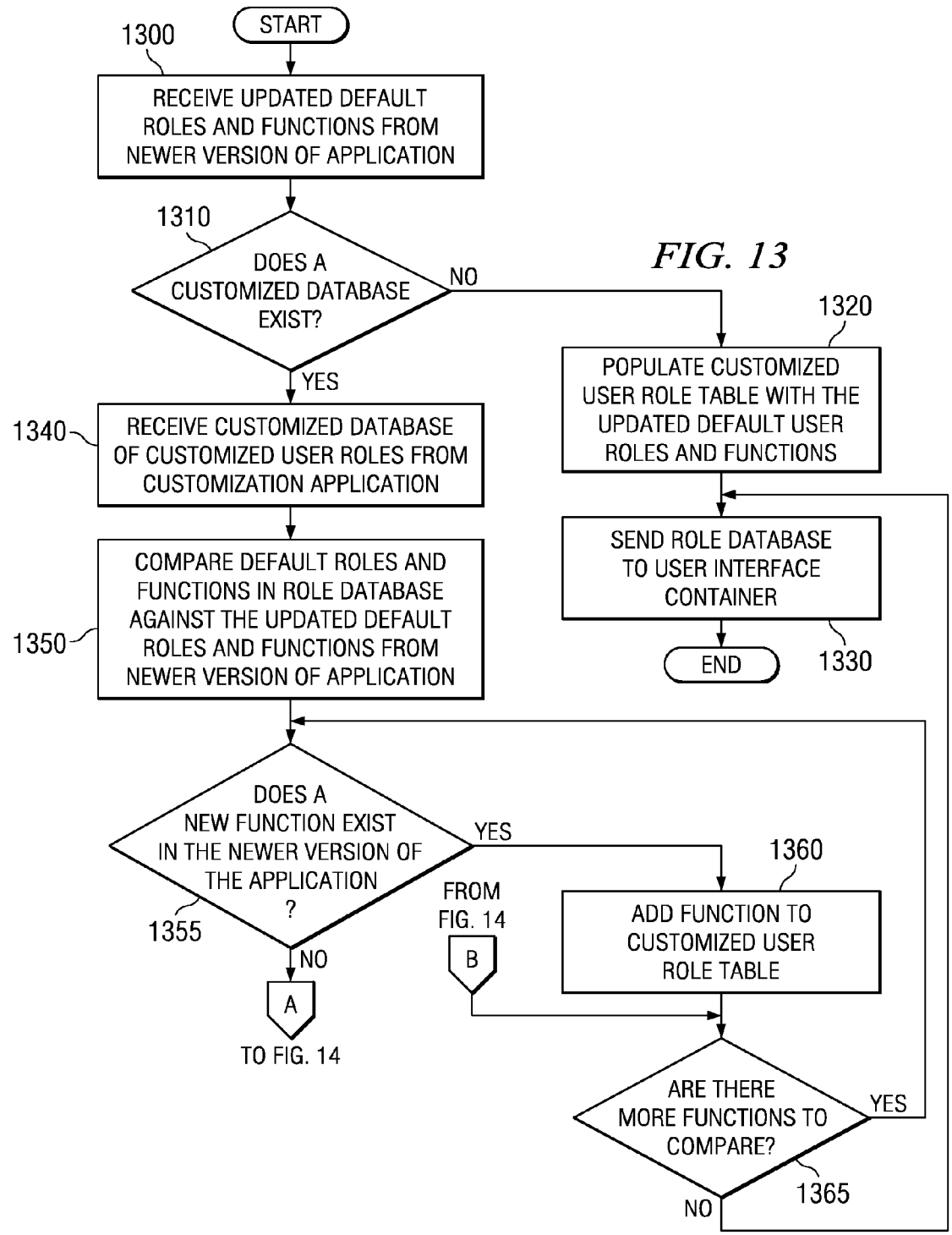
FIGS. 13 and 14 are a flowchart illustrating a process of updating the role database with information from a newer version of an application in accordance with an illustrative embodiment.
Figure 14:
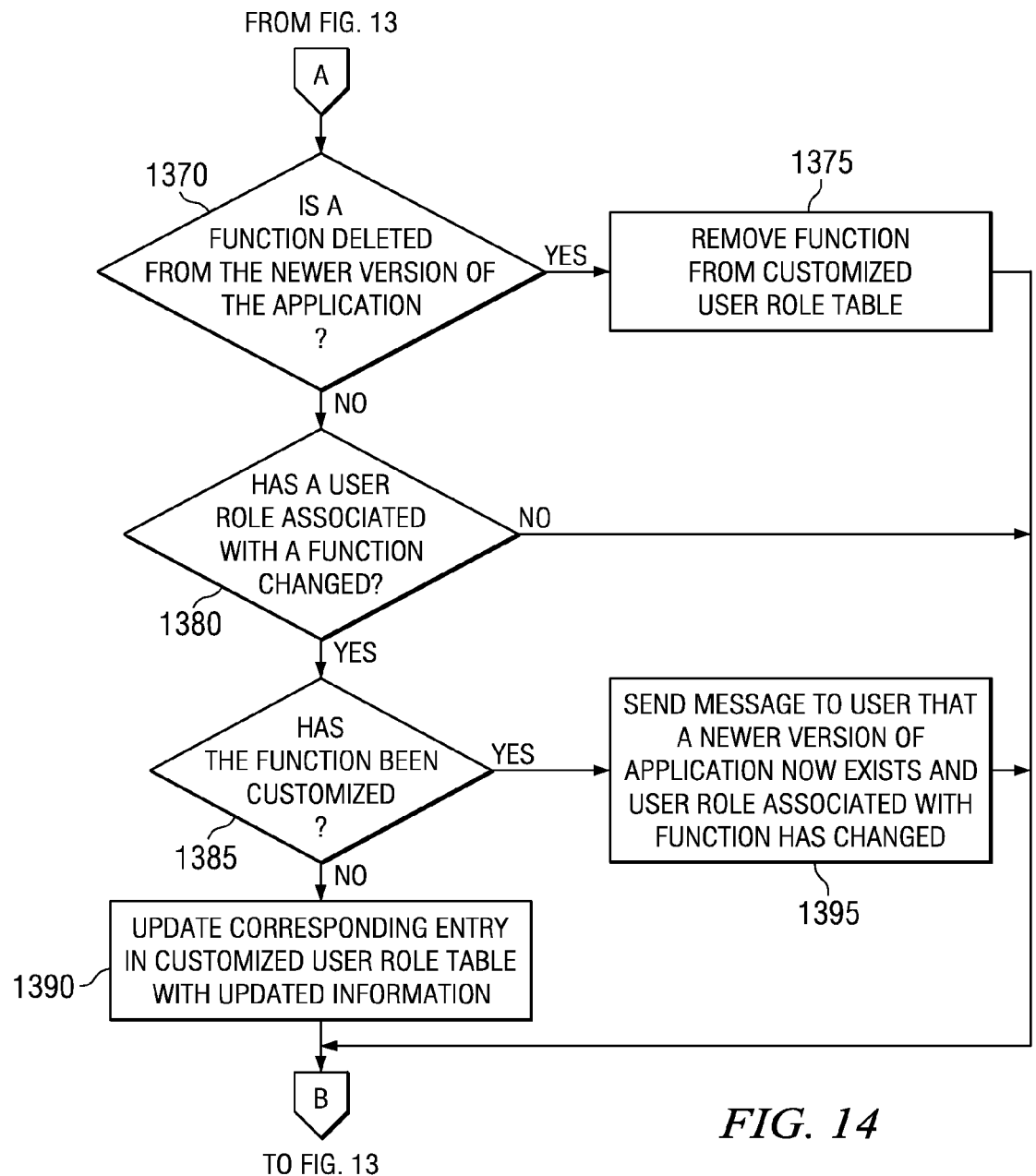

FIGS. 13 and 14 are a flowchart illustrating a process of updating the role database with information from a newer version of an application in accordance with an illustrative embodiment. The process is executed in a role database, such as role database 360 of FIG. 3.

The process begins with the role database receiving default roles and functions from the newer version of the application (step 1300). A determination is then made as to whether a customized database exists (step 1310). If a customized database does not exist ("no" output to step 1310), then the customized user role table is populated with the updated default user roles and functions (step 1320). The role database is then sent to a user interface container (step 1330), with the process terminating thereafter.

Returning to step 1310, if a customized database does exist ("yes" output to step 1310), then the role database receives the customized database of customized user roles from a customization application (step 1340). The role database then compares the default roles and functions currently residing in the role database against the updated default roles and functions from the newer version of the application (step 1350). A determination is then made as to whether a new function exists in the newer version of the application (step 1355). If a new function does exist ("yes" output to step 1355), then the function is added to the customized user role table (step 1360). A determination is then made as to whether there are more functions to compare (step 1365). If there are more functions to compare ("yes" output to step 1365), then the process returns to step 1355 and repeats (step 1355 through 1395). If, however, there are no more functions to compare ("no" output to step 1365), then the role database is sent to the user interface container (step 1330), with the process terminating thereafter.

Returning to step 1355, if a new function does not exist ("no" output to step 1355), a determination is made as to whether a function has been deleted from the newer version of the application (step 1370). If a function has been deleted ("yes" output to step 1370), then the function is removed from the customized user role table (step 1375). A determination is then made as to whether there are more functions to compare (step 1365). If there are more functions to compare ("yes" output to step 1365), then the process returns to step 1355 and repeats (step 1355 through 1395). If, however, there are no more functions to compare ("no" output to step 1365), then the role database is sent to the user interface container (step 1330), with the process terminating thereafter.

Returning to step 1370, if a function has not been deleted ("no" output to step 1370), then a determination is made as to whether the user role associated with the function has changed (step 1380). If the user role associated with the function has changed ("yes" output to step 1380), then a determination is made as to whether the function has been customized in the customized user role table (step 1385). If the function has not been customized ("no" output to step 1385), then the corresponding entry in the customized user role table is updated with the updated information (step 1390). A determination is then made as to whether there are more functions to compare (step 1365). If there are more functions to compare ("yes" output to step 1365), then the process returns to step 1355 and repeats (step 1355 through 1395). If, however, there are no more functions to compare ("no" output to step 1365), then the role database is sent to the user interface container (step 1330), with the process terminating thereafter.

Returning to step 1385, if the function has been customized ("yes" output to step 1385), then the role database sends a message to the user that a newer version of the application now exists and the user role associated with a function is changed in the newer version (step 1395). A determination is then made as to whether there are more functions to compare (step 1365). If there are more functions to compare ("yes" output to step 1365), then the process returns to step 1355 and repeats (step 1355 through 1395). If, however, there are no more functions to compare ("no" output to step 1365), then the role database is sent to the user interface container (step 1330), with the process terminating thereafter.

Returning to step 1380, if the user role associated with the function has not changed ("no" output to step 1380), then determination is then made as to whether there are more functions to compare (step 1365). If there are more functions to compare ("yes" output to step 1365), then the process returns to step 1355 and repeats (step 1355 through 1395). If, however, there are no more functions to compare ("no" output to step 1365), then the role database is sent to the user interface container (step 1330), with the process terminating thereafter.

FIG. 15 is a flowchart illustrating a process for providing identified features to a user in accordance with an illustrative embodiment. The process is executed in a user interface container, such as user interface container 380 of FIG. 3.

The process begins with the user interface container receiving features from an application (step 1500). The user interface container then receives a role database for the application (step 1510). The user interface container also receives a selection of a user role for an application from a user (step 1520). The selected user role is compared against the role database (step 1530). A determination is then made as to whether a set of customized features for the selected user role exists in the role database (step 1540). If a set of customized features exists ("yes" output to step 1540), then the user role interface sends the set of customized features to the user interface (step 1550), with the process terminating thereafter. However, if a set of customized features does not exist ("no" output to step 1540), then the user role interface sends the default features associated with the selected user role to the user interface (step 1560), with the process terminating thereafter.

FIG. 16 is a flowchart illustrating a process for customizing default user roles in accordance with an illustrative embodiment. The process is executed in a customization application, such as customization application 370 of FIG. 3.

The process beings with a determination as to whether the user wishes to create or update a customized role database (step 1600). If the user wishes to create a customized role database ("create" output to step 1600), then the customization application determines which application and plug-in set the user wishes to work with (step 1610). Then the customization application obtains the default roles and functions from the selected application or plug-in (step 1611). The customization application then organizes the default roles and functions into a graphical user interface (step 1612) and sends the graphical user interface to a user interface (step 1613). The customization application then receives a list of functions with modified user roles from the user interface (step 1614) and creates a customized database for the user for the particular application or plug-in (step 1615). The customized database is then saved (step 1616), with the process terminating thereafter.

Returning now to step 1600, if the user wishes to update a customized role database ("update" output to step 1620), then the customization application loads the customized database requested by the user (step 1620). A determination is then made as to whether a new version of the application or plug-in exists (step 1630). If a new version of an application or plug-in exists ("yes" output to step 1630), then the customization application obtains the new version of default roles and functions from the application or plug-in (step 1640). The customization application then compares the updated default roles with the default roles stored in the role database (step 1641). The customization application then sends a list of functions with the customized user roles along with the changed default user role information to a user interface (step 1642). The customization application then receives modifications to the customized database (step 1643) and saves the modifications into the customized database (step 1644), with the process terminating thereafter.

Returning now to step 1630, if the application or plug-in has not been updated ("no" output to step 1630), then the customization application sends the customized database to the user interface (step 1650), receives the modifications to the customized database (step 1652), and then saves the modifications (step 1654), with the process terminating thereafter.

The illustrative embodiments provide a computer implemented method, a data processing system, and a computer program product for managing user roles. A customization application receives a request to modify a user role for an application. In response to the request, the customization application allows a user to modify a set of features associated with the user role to form a set of customized features. A user modifies a set feature by changing a set of default features or an existing set of customized features. The set of default features are provided by the application. A user has the option to modify none of, a portion of, or all the default features. A user may modify features from any updated versions of an application as well. Furthermore, a user may use an inherency function to adopt the features of another user role.

A role database stores the set of customized features for the user role. The role database may be located in a local storage, such as the memory of the data processing system for the user, or on a remote server that is shared by a number of different users. The user roles in the role database are available to the number of different users for use with an application.

The ability to customize user roles provides a customer or user with the capability to easily modify the features within an application. The user is not limited to customizing only pre-determined groups of features, but has the ability to innovatively modify any feature within the application. For example, a user may create a whole new set of features associated with a particular user role or simply modify the names of a user role or feature. As a result, a user can determine the level of complexity with which the customer wishes to interact with a particular application. Additionally, a user has the flexibility to control the number of features available to the user and what features to display on the user interface. Since the customizations can be shared with other users, other users can also benefit from existing customizations without having to modify their own user interfaces from the beginning.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing user roles, the computer implemented method comprising:

extracting functions and user roles from an application to form extracted information, wherein specific functions are associated with each user role of the application;

storing the extracted information in a role database;

responsive to receiving a request to modify a selected user role from the user roles for an application, modifying a set of features associated with the selected user role to form a set of customized features, wherein the set of features is a set of graphical representations of the specific functions associated with the selected user role;

storing, by a computer, the set of customized features for the selected user role in the role database to form a modified user role for the application, wherein user roles in the role database are shared by a plurality of users of the application;

receiving a selection of a user role for the application through a user interface from a particular user in the plurality of users, wherein the selection of a user role forms the selected user role;

determining whether a set of customized features for the selected user role is present in the role database; and responsive to the set of customized features for the selected user role being present in the role database, providing the set of customized features associated with the selected user role for use in the application by the particular user.

2. The computer implemented method of claim 1 further comprising:
responsive to the set of customized features for the selected user role not being present in the role database, providing default features associated with the selected user role for use in the application by the particular user, wherein the set of default features is a set of graphical representations of default functions associated with the selected user role.

3. The computer implemented method of claim 2, wherein the default features are provided by the application.

4. The computer implemented method of claim 1, wherein the role database is located on at least one of a local storage and a remote server shared by the plurality of different users.

5. The computer implemented method of claim 1, wherein the step of modifying a set of features associated with the selected user role to form a set of customized features comprises:
providing a set of default features associated with the selected user role, wherein the default features are provided by the application, and the set of default features is a set of graphical representations of default functions associated with the selected user role;
receiving modifications to the default features; and
replacing the default features with the modifications to form a set of customized features.

6. The computer implemented method of claim 1 further comprising:
determining whether updated features for the set of customized features exist; and
responsive to the updated features existing, merging the updated features with the set of customized features.

7. The computer implemented method of claim 6, wherein the step of merging the updated features with the set of customized features comprises:
adding the updated features to the set of customized features; and
removing features from the set of customized features that are not included in the updated features.

8. The computer implemented method of claim 7, wherein the step of adding the updated features to the set of customized features includes:
allowing a particular user in the plurality of users to determine whether to add the updated feature to the set of customized features.

9. The computer implemented method of claim 1, wherein the step of modifying a set of features associated with the selected user role to form a set of customized features comprises:
providing an inherit function that allows one user role to adopt the set of features for another user role to form a hierarchy of user roles.

10. A data processing system comprising:
a bus;
a main memory connected to the bus; wherein the main memory stores computer usable program code therein;
a processing unit connected to the bus, wherein the processing unit executes the computer usable program code to direct the data processing to extract functions and user roles from an application to form extracted information, wherein specific functions are associated with each user role of the application; store the extracted information by a computer in a role database; responsive to receiving a request to modify a selected user role from the user roles for an application, modify a set of features associated with the selected user role to form a set of customized features, wherein the set of features and the set of customized features is a set of graphical representations of the specific functions associated with the selected user role; and store, by the computer, the set of customized features for the selected user role in the role database to form a modified user role for the application, wherein user roles in the role database are shared by a plurality of users of the application; and
a user interface that sends a selection of a user role for the application from a particular user in the plurality of users to a user interface container connected to the role database, wherein the selection of the user role forms the selected user role, wherein the user interface container determines whether a set of customized features for the selected user role is present in the role database, and responsive to the set of customized features for the selected user role being present in the role database, the user interface container provides the set of customized features for the selected user role for use in the application by the particular user.

11. The data processing system of claim 10 further comprising:
default features associated with the selected user role for use in the application by the particular use responsive to the set of customized features for the selected user role not being present in the role database, wherein the default features are stored in the role database and the set of default features is a set of graphical representations of default functions associated with the selected user role.

12. The data processing system of claim 11, wherein the default features are provided by the application.

13. The data processing system of claim 10, wherein the role database is located on at least one of a local storage and a remote server shared by the plurality of different users.

14. The data processing system of claim 10, wherein the role database further comprises:
a set of default features associated with the selected user role, wherein the default features are provided by the application and the set of default features is a set of graphical representations of default functions associated with the selected user role, and wherein the role database receives modification to the default features from the customization application, and wherein the role database replaces the default features with the modifications to form a set of customized features.

15. The data processing system of claim 10 wherein the role database determines whether updated features for the set of customized features exist, and wherein the role database merges the updated features with the set of customized features in response to the existence of the updated features.

16. The data processing system of claim 15, wherein the merging of the updated features with the set of customized features comprises:
adding the updated features to the set of customized features; and
removing features that are not included in the updated features from the set of customized features.

17. The data processing system of claim 16, wherein the adding the updated features to the set of customized features comprises:
allowing a particular user in the plurality of users to determine whether to add the updated feature to the set of customized features.

18. The data processing system of claim 10, wherein the set of customized features for the selected user role in the role database to form a modified user role for the application further comprises:

an inherit function that allows one user role to adopt the set of features for another user role to form a hierarchy of user roles.

19. A computer program product comprising a computer usable medium having computer usable program code stored thereon, the computer usable program code comprising:

computer usable program code for extracting functions and user roles from an application to form extracted information, wherein specific functions are associated with each user role of the application;

computer usable program code for storing the extracted information in a role database of a computer;

computer usable program code responsive to receiving a request to modify a selected user role from the user roles for an application, for modifying a set of features associated with the selected user role to form a set of customized features, wherein the set of features is a set of graphical representations of the specific functions associated with the selected user role;

computer usable program code for storing, by the computer, the set of customized features for the selected user role in the role database to form a modified user role for the application, wherein user roles in the role database are shared by a plurality of users of the application;

computer usable program code for receiving a selection of a user role for the application through a user interface from a particular user in the plurality of users, wherein the selection of a user role forms the selected user role;

computer usable program code for determining whether a set of customized features for the selected user role is present in the role database; and computer usable program code responsive to the set of customized features for the selected user role being present in the role database, for providing the set of customized features associated with the selected user role for use in the application by the particular user.

20. The computer program product of claim 19 further comprising:

computer usable program code responsive to the set of customized features for the selected user role not being present in the role database, for providing default features associated with the selected user role for use in the application by the particular user, wherein the set of default features is a set of graphical representations of default functions associated with the selected user role.

21. The computer program product of claim 20, wherein the default features are provided by the application.

22. The computer program product of claim 19, wherein the role database is located on at least one of a local storage and a remote server shared by the plurality of different users.

23. The computer program product of claim 19, wherein the computer usable program code for modifying a set of features associated with the user role to form a set of customized features comprises:

computer usable program code for providing a set of default features associated with the user role, wherein the default features are provided by the application, wherein the set of default features is a set of graphical representations of default functions associated with the selected user role;

computer usable program code for receiving modifications to the default features; and computer usable program code for replacing the default features with the modifications to form a set of customized features.

24. The computer program product of claim 19, further comprising:

computer usable program code for determining whether updated features for the set of customized features exist; and computer usable program code responsive to the updated features existing, for merging the updated features with the set of customized features.

25. The computer program product of claim 24, wherein the computer usable program code for merging the updated features with the set of customized features comprises:

computer usable program code for adding the updated features to the set of customized features; and computer usable program code for removing features that are not included in the updated features from the set of customized features.

26. The computer program product of claim 25, wherein the computer usable program code for adding the updated features to the set of customized features includes:

computer usable program code for allowing a particular user in the plurality of users to determine whether to add the updated feature to the set of customized features.

27. The computer program product of claim 19, wherein the computer usable program code for modifying a set of features associated with the selected user role to form a set of customized features comprises:

computer usable program code for providing an inherit function that allows one user role to adopt the set of features for another user role to form a hierarchy of user roles.

* * * * *